June 12, 1928.  
J. M. GERHARDT  
VEHICLE PLATFORM  
Filed Jan. 3, 1927

1,673,671

2 Sheets-Sheet 1

Inventor
John M. Gerhardt

Witnesses
By Richard B. Owen
Attorney

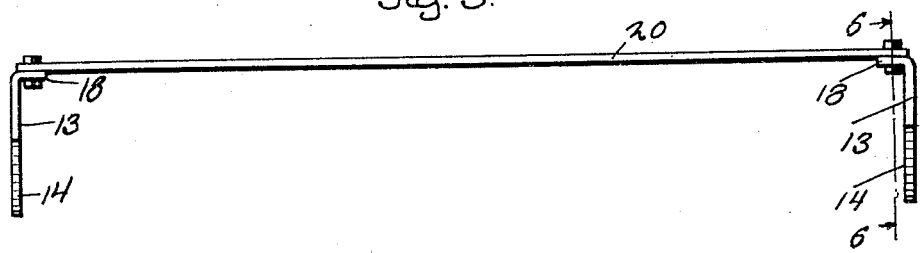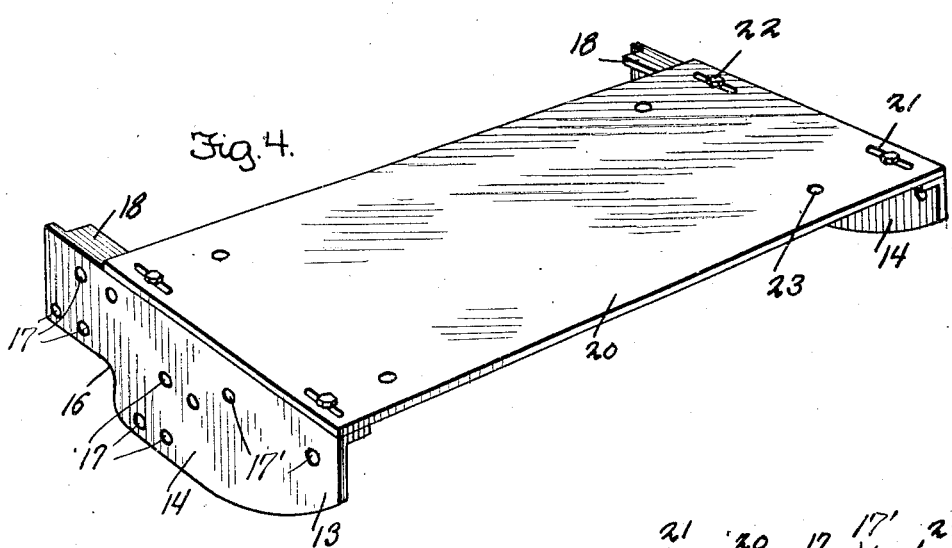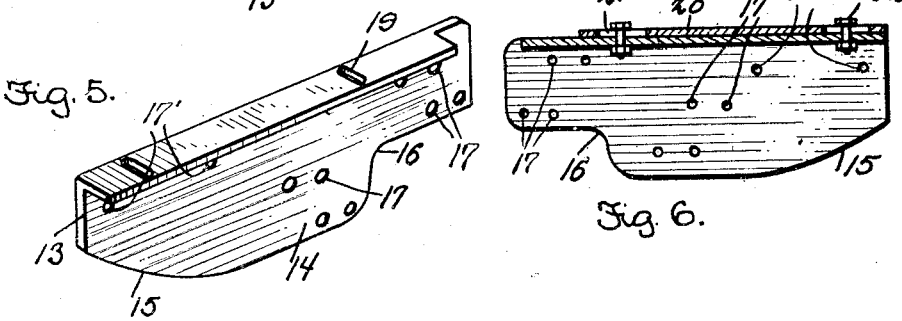

Patented June 12, 1928.

1,673,671

UNITED STATES PATENT OFFICE.

JOHN M. GERHARDT, OF CHARLESTON, ILLINOIS.

VEHICLE PLATFORM.

Application filed January 3, 1927. Serial No. 158,755.

My invention relates to improvements in luggage carriers for automobiles or the like vehicles and it is an object of the invention to provide an extension platform for detachable connection to the projecting end portions of the side bars of an automobile frame or chassis and capable of attachment to side bars disposed at different degrees of angularity and different distances apart, as well as a platform supported in a manner to permit relative lateral and longitudinal adjustment of the same, all as will be hereinafter more particularly described and claimed.

Figure 1:
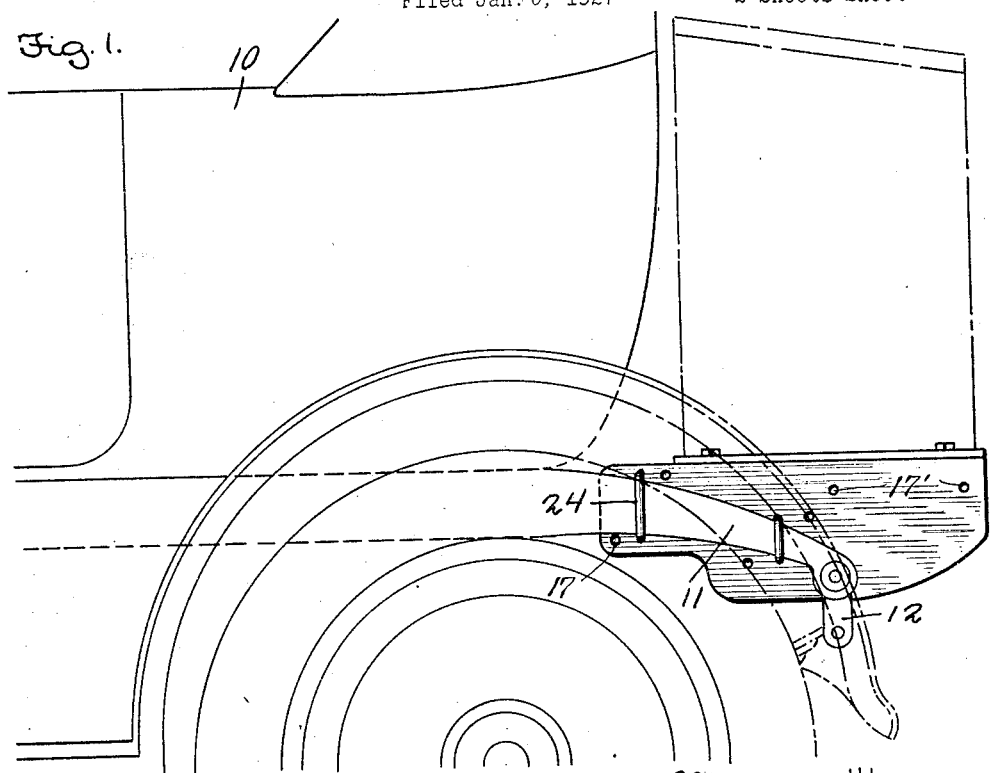
Figure 2:
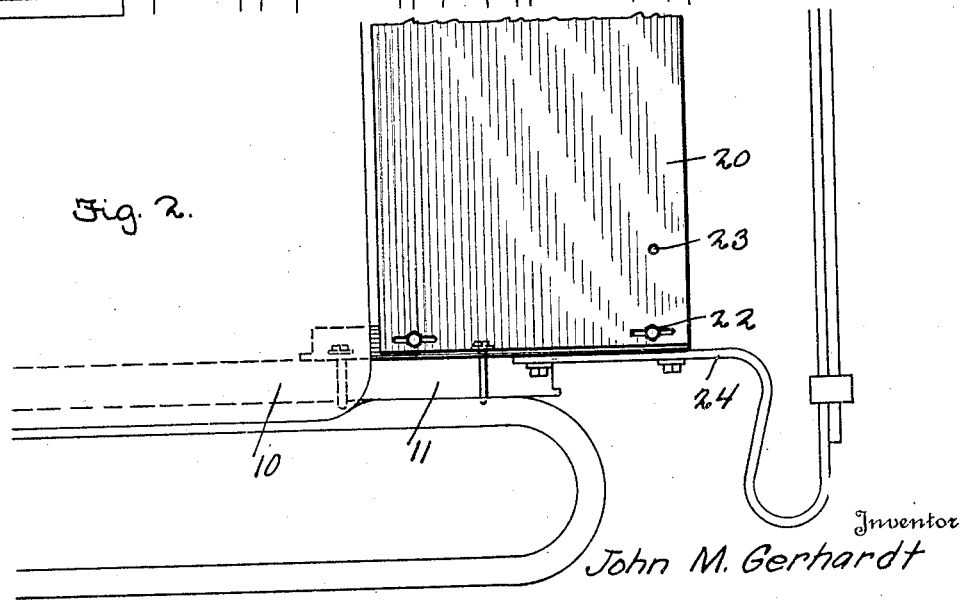

Referring to the accompanying drawings which are made a part hereof and on which similar reference characters indicate similar parts, Figure 1 is a fragmentary side elevation illustrating one application of my invention, Figure 2, a fragmentary top plan view, Figure 3, a rear elevation of my invention, Figure 4, a perspective, Figure 5, a perspective of one of the supporting brackets, and Figure 6, a section on the line 6—6 of Fig. 3.

In the drawings reference character 10 indicates the rear portion of an automobile having a chassis or frame terminating at its rear end in tapered, curved extensions 11 formed at their ends for engagement by spring hangers 12.

My invention is designed for engagement with the rear end portions of the chassis and I provide a pair of side brackets designated generally by the numeral 13, such brackets including vertical bracket plates 14 of substantially rectangular outline. The lower edges of the bracket plates are curved upwardly at the rear as indicated at 15 and are formed with substantially right angle recesses 16 at their forward portions. A plurality of openings 17 are provided in the bracket plates for the accommodation of clamping members and other openings 17' are provided for the attachment of a bumper.

The upper edges of the bracket plates are provided with inwardly extending right angular flanges 18 adapted to be disposed in substantially horizontal position and being also provided with a transversely extending slot 19 adjacent each end. A flat, substantially rectangular cross plate 20 is adapted to have its ends supported upon the flanges 18 of the brackets and such plate is provided with transverse slots 21 disposed at right angles to the slots 19 in the bracket and in registration therewith. Any desired fastening means such as bolts 22 may be employed for fastening the plate 20 to the brackets.

The plate 20 is preferably provided with openings 23 arranged inwardly of its ends for the accommodation of fastening means for securing a trunk or the like thereon. The bracket plates or brackets are secured in vertical position to the rear frame extensions of the vehicle by means of U-bolts 24 or the like which extend through two of the openings 17. On account of the location of the holes 17 a varied adjustment of the brackets and plate 20 is provided.

On account of the particular construction of my device it may be applied to various makes of automobiles being adaptable to slight variations in form and spacing of the rear frame extensions. A bumper 24' is shown connected to the bracket and thus my device serves both as a bumper support and for supporting trunks or other baggage used for various purposes.

It will be obvious to those skilled in the art that various changes may be made in my device without departing from the spirit of the invention, and I, therefore, do not limit myself to what is shown in the drawings and described in the specification, but only as set forth in the appended claims.

Having thus fully set forth my said invention, what I claim as new and desire to secure by Letters Patent, is:

1. A luggage carrier for vehicles comprising a pair of brackets for attachment to the end portions of the side frame members each bracket including a plate having a supporting flange at its upper edge, and a cross plate having its ends resting upon said flanges and forming a platform, the flanges and ends of the cross plate being provided with slots extending along intersecting lines to provide for relative lateral and longitudinal adjustment of the plate and brackets, substantially as set forth.

2. A carrier attachment for vehicles comprising a pair of brackets for attachment upon the end portions of the side frame members of a vehicle each including a plate having a supporting flange at its upper edge, a cross plate resting upon said flanges, the flanges being formed with transversely extending slots, the cross plate being provided with slots disposed substantially at right angles to the slots of the flanges, and bolts extending through said intersecting slots and permitting relative lateral and longitudinal adjustment of the brackets and cross plate, substantially as set forth.

3. A carrier attachment for vehicles comprising a pair of brackets for attachment on the end extensions of the side frame members of a vehicle each including a plate having a supporting flange at its upper edge, a cross plate supported upon said flanges and forming a platform, means for securing the cross plate to the flanges, each bracket being provided with pairs of upper and lower openings, the openings of the upper and lower pairs being relatively laterally offset whereby one of the openings of one pair will be vertically opposite the non-corresponding opening of the other pair and the corresponding openings of the two pairs will be obliquely opposite each other to provide for the insertion of spaced shanks of the U-bolt with the bolt in a vertical or inclined position to provide for attachment of the bracket plate to frame bars having varying linear contour, substantially as set forth.

4. A luggage carrier for automobiles comprising a pair of brackets having supporting flanges, means for securing said brackets to the projecting end portions of the automobile frame and capable of attachment to projecting end portions arranged at various degrees of angularity, a platform supported on said brackets and means for fastening the platform to the flanges, constructed and arranged to permit lateral and longitudinal adjustment of the platform as a whole with respect to the brackets, substantially as set forth.

In testimony whereof I affix my signature.

JOHN M. GERHARDT.